3,215,617
HYDROGENATION CRACKING PROCESS IN TWO STAGES

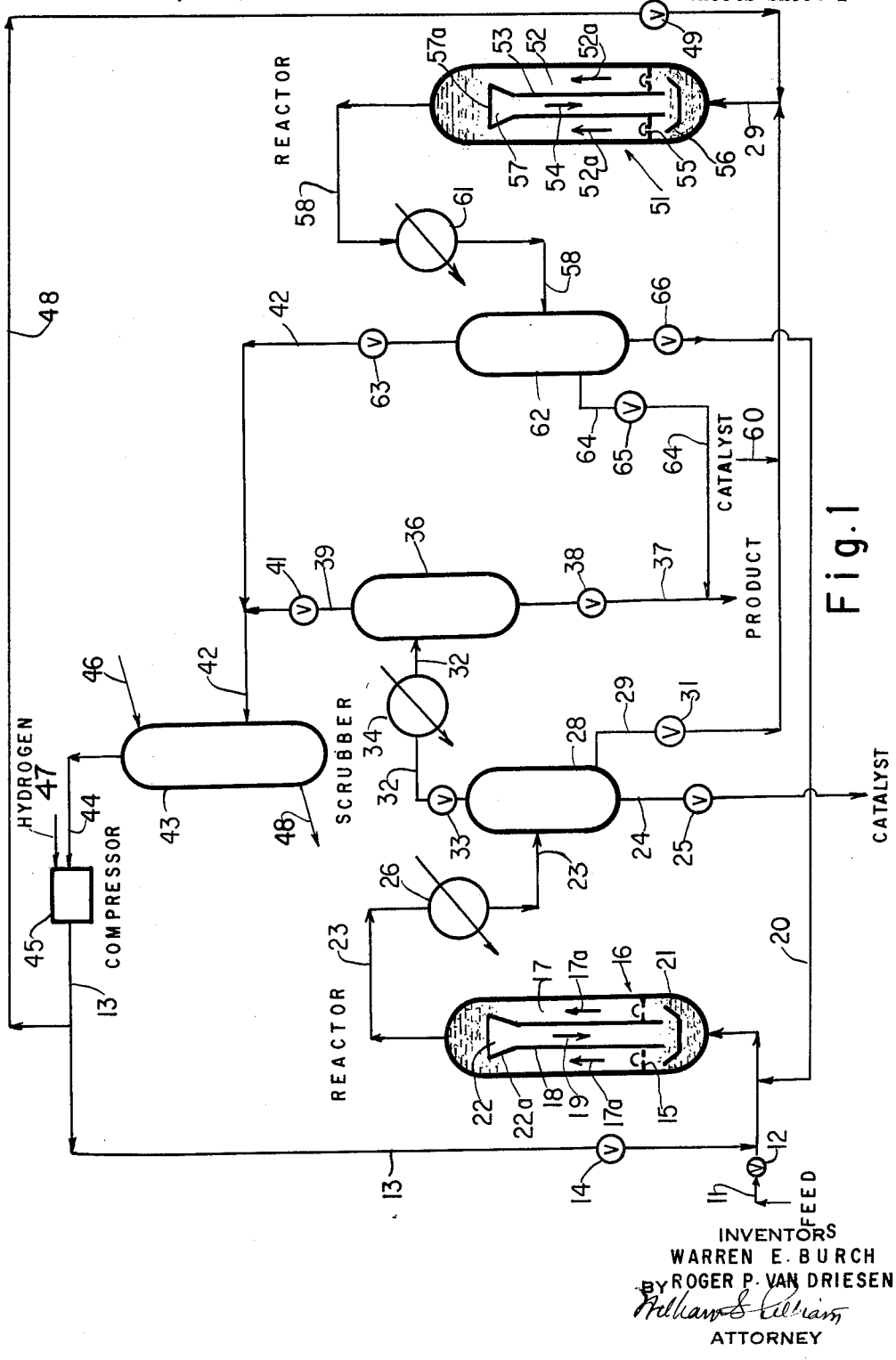

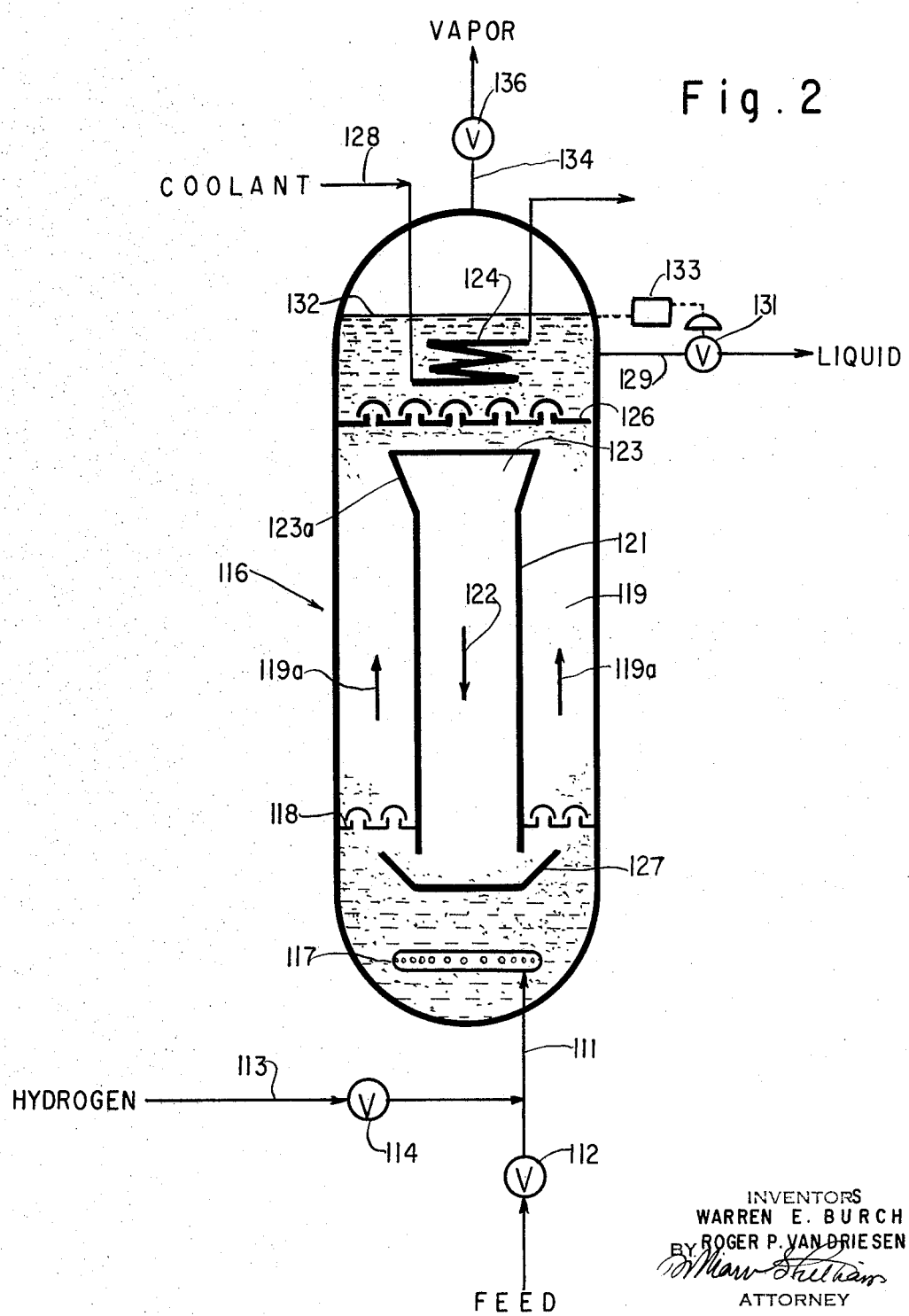

Warren E. Burch, Westfield, and Roger P. Van Driesen, Hopewell, N.J., assignors, by mesne assignments, to Cities Service Research and Development Company, a corporation of Delaware
Filed June 13, 1962, Ser. No. 202,322
2 Claims. (Cl. 208—59)

This invention relates to the treatment of hydrocarbon oil and more particularly to the treatment of liquid hydrocarbon oil in the presence of hydrogen. The invention has particular application in the hydrogenation and hydrocracking of relatively heavy hydrocarbon oil to produce improved products of lower boiling range.

Hydrocracking processes for the conversion of heavy hydrocarbon oils to light and intermediate naphthas of good quality for reforming feedstocks, fuel oil and gasolene are well known. In such processes, it is normally desirable to be able to control at least to some extent the relative amounts of the various products produced. For instance, it may sometimes be desirable to produce relatively large quantities of gasoline boiling range product, while at other times relatively greater quantities of slightly higher boiling products such as those suitable for fuel oils may be desired.

Hydrocracking processes of the type described above have most commonly been carried out using a fixed bed of catalyst with hydrocarbon oil and hydrogen passing in downflow over the catalyst. Hydrogen consumption is very high in such processes and a considerable amount of heat is released in the reactor due to the exothermic nature of the reactions taking place. This normally results in a considerable temperature rise across the catalyst bed and in increased carbon deposition of the catalyst.

In order to limit the heat release in the reactor in processes of the type described above, it is usually necessary to limit the degree of cracking per pass. In order to reach a satisfactory net conversion of higher boiling material to gasolene and fuel oil and to afford control of the temperature in the fixed bed reactor, the products from the catalytic hydrocracking operation are usually fractionated and the unconverted higher boiling material is recycled back to the hydrocracking operation. Such fractionation and recycling is expensive and cumbersome. Such operation also results in extremely low space velocities based on fresh feed, partly because of the excessive reactor volume occupied by recycled liquid and by already converted material.

It has also been suggested that certain types of hydrogenation processes might be carried out in the presence of finely divided catalyst which passes upwardly through the hydrogenation zone in the form of a slurry together with feed and hydrogen. A suitable procedure for utilizing such a slurry of catalyst and liquid in hydrocracking processes is shown, for instance, in co-pending application S.N. 839,255 of Roger P. Van Driesen, filed September 10, 1959. For the reasons discussed below, however, slurry catalyst systems, even of the type described in the above-mentioned co-pending application or the type described herein, while suitable for certain situations are not entirely suitable for use in all hydrocracking reactions of the type described above. In particular, as will be pointed out below, slurry reactors are not suitable when certain product distributions are desired.

It has also been suggested to use a so-called ebullient bed of the type described, for instance, in Patent No. 2,987,465 to Johanson in certain types of hydrogenation processes. Ebullient bed reaction systems (to be discussed in greater detail below), while suitable for certain types of hydrogenation reactions are as discussed below, not completely suited to all types of hydrocracking reactions of the type described above.

The operation of hydrogenation and more specifically hydrocracking processes such as those described briefly above is further complicated by the frequent premature poisoning and deactivation of catalysts by nitrogen compounds present in the feed.

It has now been found that while no one catalytic process or particular combination of processes of the various types described above is suitable for carrying out hydrocracking reactions over the broad range of desired feeds and desired products, it is possible by a proper combination of suitable processes and operating conditions to carry out such reactions using an extremely broad range of feeds while obtaining desired products covering an equally broad range. For a full appreciation of the manner in which this may be accomplished for various combinations of particular feeds and products, reference should be had not only to the present application but also to our co-pending applications and those of Roger P. Van Driesen filed simultaneously herewith. By the use of the processes described in these applications, it is generally possible to obtain more satisfactory conversion of feed to desired products than could be obtained by operating presently known processes under equivalent operating conditions.

The present invention provides a unique method for treating hydrocarbon oil which is especially adapted for conversion of specific feeds to specific desired products using specified operating conditions as described below. This method includes treatment of high boiling feed having a high nitrogen content with a slurry of finely divided catalyst in a first hydrogenation zone to partially hydrogenate and crack the feed and remove nitrogen therefrom. Product from the first hydrogenation zone is further treated with a slurry of finely divided hydrogenation catalyst having cracking activity to further hydrocrack the oil into desired products. By using this unique process as described below, better conversion of feed to desired products can be obtained than would be possible using previously known processes at the same operating conditions.

It is an object of the present invention to provide an improved process for the hydrogenation and hydrocracking of hydrocarbon oil in which the difficulties described above are substantially reduced or eliminated and in which improved conversion to desired products is obtained.

In accordance with a preferred embodiment of the present invention, hydrocarbon feed oil containing at least about 500 parts per million (p.p.m.) nitrogen is passed through a first hydrogenation zone to at least partly hydrogenate and crack the feed and remove nitrogen compounds therefrom. At least about 40 volume percent of such feed boils above 650° F. The hydrocarbon portion of the effluent from the first hydrogenation zone preferably boils between about 350 and about 700° F., has no more than about 10 volume percent boiling above about 650° F., contains less than about 30 p.p.m. nitrogen and has a ratio of heavy naphtha (boiling between 185 and 400° F.) to light naphtha (boiling between 65 and 185° F.) of at least 5 to 1. Such effluent is preferably cooled and is then separated to form a liquid fraction substantially free of nitrogen compounds and a gaseous fraction containing hydrogen and nitrogen in the form of ammonia, and substantially free of material boiling above 400° F. Ammonia is preferably removed from the gaseous fraction. Hydrogen-containing gas from the gaseous fraction is recycled to the first hydrogenation zone, while the liquid fraction passes to a second hydrogenation zone in which it is contacted with added hydrogen in the presence of hydrogenation catalyst having cracking activity to hydrocrack at least a portion of such liquid fraction. By operating the second hydrogenation zone under the preferred conditions described below, a product may be produced at least about 60 volume percent of which boils below 400° F. and which has a ratio of heavy naphtha (boiling between about 185 and about 400° F.) to light naphtha (boiling between about 65 and about 185° F.) of at least about 2 to 1. For a better understanding of the invention reference should be had to the accompanying drawings in which:

FIGURE 1 is a somewhat diagrammatic illustration in which equipment is shown in elevation of a suitable arrangement of apparatus for carrying out a preferred embodiment of the invention and;

FIGURE 2 is a somewhat diagrammatic illustration in which equipment is shown in elevation of another suitable arrangement of apparatus for use in the same process.

Referring to FIGURE 1, feed oil entering through a conduit 11 and valve 12 passes into the lower portion of a hydrogenation reactor 16 together with hydrogen introduced through a conduit 13 and valve 14. The feed may be any suitable hydrocarbon oil, preferably one boiling in the range between about 350 and 1100° F., and may include for instance, virgin or thermal naphthas, catalytic cracking naphthas, cycle oils, virgin or thermal gas oils, coker distillate, vacuum gas oils, deasphalted gas oils and any other fractions in these general boiling ranges derived from crude petroleum or from naturally occurring tars or shale oils or from synthetic crudes produced by hydrogen treating or cracking of petroleum residuum, natural tar, shale oil or tar sand. Suitable feed oils might be obtained from such sources directly or by suitable treatment such as catalytic hydrogenation or distillation. Relatively heavy distillates having at least about 40 volume percent boiling above 650° F., are especially suitable for treatment in accordance with the present invention. Such feed oils frequently contain nitrogen compounds and a preferred embodiment of the invention is especially applicable to the treatment of hydrocarbon distillate oil at least about 40 volume percent of which boils above 650° F., and which contains at least about 500 parts per million of nitrogen.

Hydrogen and feed oil introduced into the hydrogenation reactor 16 through the conduit 11 pass upwardly through suitable distributing means such as a conventional bubble cap plate 15 and through a hydrogenation zone 17 as indicated by arrows 17a. The hydrogenation zone 17 preferably contains catalyst to aid in the hydrogenation of the feed oil and the conversion of nitrogen contained in the feed oil to ammonia. The catalyst present in the hydrogenation zone 17 may be suitable hydrogenation catalyst such as cobalt, iron, molybdenum, nickel, tungsten, platinum, palladium, naturally occurring clays, etc. as well as combinations of the same. Such catalysts, as well as their sulfides and oxides, may be used alone or together with other suitable catalysts and may, if desired, be supported on suitable bases such as alumina or silica-alumina. The use of catalyst having cracking activity is preferred. Also, some thermal cracking may take place. The primary purpose of the hydrogenation zone 17 is to remove nitrogen from the feed oil as well as to remove sulfur and partially hydrogenate and crack the feed oil to make a better feed for the second hydrogenation step to be described below. This is accomplished by removal of at least 90 percent of the material boiling above 650° F.

In order to maintain the temperature within the hydrogenation zone 17 as close to the desired temperature as possible and to obtain most efficient treatment with maximum reaction zone volume, a mixture of liquid and catalyst is recycled from the upper portion of the hydrogenation zone 17 to the lower portion thereof at a relatively high rate. While any suitable means for recycling this slurry of catalyst and liquid may be utilized, it is preferred that such recycle be produced through a recycle conduit 18 as indicated by an arrow 19. This is accomplished by allowing liquid substantially free of gas to be recycled downwardly through the recycle conduit with the circulation being maintained by the difference in density between the material substantially free of gas in the recycle conduit 18 and the mixture of liquid and gas in the hydrogenation zone 17. As shown in FIGURE 1, an upper portion 22a of the recycle conduit 18 preferably forms an enlarged gas disengaging zone 22 adapted to disengage gas from liquid being recycled through the conduit 18. Liquid may be recycled through the conduit 18 at suitable rates such as between about 1 and about 60 times the volume of fresh feed introduced through the conduit 11. Recycle rates between about 7 and 20 volumes of recycle liquid per volume of fresh feed are generally preferred. The velocity of liquid in the recycle conduit is preferably maintained between about 3 and about 10 feed per second. As shown in FIGURE 1, a deflector 21 is preferably provided in order to deflect recycled material in an upward direction for passage through the hydrogenation zone 17 together with fresh feed and hydrogen. The catalyst present in the hydrogenation zone 17 is in the form of finely divided catalyst of suitable particle size. While catalyst of any suitable particle size may be used, it has been found that catalysts having particle sizes less than about 300 microns are especially suitable.

While a wide variety of suitable operating conditions may be employed in the hydrogenation zone 17, it is preferred that hydrogen be introduced through the conduit 13 in quantities suitable to the particular reactions desired, such as between about 1,000 and about 50,000 standard cubic feet of hydrogen per barrel of fresh feed with hydrogen rates above about 7,000 standard cubic feet per barrel being preferred. Hydrogen obtained through the conduit 13 is in the form of hydrogen-containing recycle gas containing about 75 volume percent hydrogen but other sources of hydrogen may, of course, be used. Likewise, partial pressure of hydrogen in the hydrogenation zone 17 may be maintained at any suitable level such as between about 500 and about 4,000 p.s.i.g. with pressure between about 1,000 and about 1,500 p.s.i.g. being preferred. Temperature in the hydrogenation zone 17 ranges between about 650 and about 900° F., depending upon the particular hydrogenation reaction desired and other operating conditions chosen with temperatures between about 700° and about 825° F. being preferred. Space velocities in the hydrogenation zone 17 may vary considerably such as between about 0.1 and about 5 volumes of feed per hour per volume of reactor capacity with space velocities between about 0.3 and about 1.5 v./hr./v. being preferred.

It is generally desirable to maintain the temperature throughout substantially the entire hydrogenation zone 17 as close to the desired temperature as possible in any given situation. Due to the highly exothermic nature of hydrogenation reactions, the normal tendency is for the temperature near the discharge of the reaction zone to be considerably higher than that near the inlet due to the hydrogenation reactions taking place as feed rises through the reactor. Without substantial recycle of reactor contents the temperature difference in the hydrogenation zone 17 might well be as much as 200–300° F. By recycling liquid and catalyst within the reactor as described above, the temperature difference can be substantially reduced. For instance, with preferred recycle rates, the temperature difference within the hydrogenation zone may usually be reduced to less than 25° F. The average reaction temperature of the material within the hydrogenation zone 17 may be controlled in any suitable manner such as by regulating the temperature of the fresh feed introduced through the conduit 11.

While it is possible to obtain a certain amount of recycle by density difference as described above without the use of an enlarged disengaging zone such as 22 on the upper end of the recycle conduit 18, the limiting factor in obtaining high recycle rates by density difference is frequently determined by the size of the cross sectional area of the upper portion of the gas disengaging zone as compared with that of the reaction zone. A disengaging zone of too small a size for the desired recycle rate may result in contained gas being carried into the recycle conduit where smaller bubbles tend to coalesce into larger bubbles which then force their way upwardly past downflowing liquid and act to reduce the effective recycle rate. Also, gas bubbles in the recycle conduit tend to effect the overall concentration of gas in the recycle conduit and therefore the density of the material in the recycle conduit. If the overall concentration of gas in the recycle conduit rises too high, the net effect will be to decrease the density of the material in the recycle conduit. In the use of apparatus such as that shown in FIGURE 1, it has been found that the cross sectional area of the upper portion of the gas disengaging zone such as 22 should frequently be at least about 1/5 of the total cross sectional area of the reactor 16 at that elevation in order to obtain preferred recycle rates.

While the area of the gas disengaging zone generally limits the maximum recycle obtainable as described above, the recycle conduit must, of course, have sufficient cross sectional area to handle the recycle stream at the desired rate without excessive throttling. If the recycle conduit is too small the pressure drop caused by the throttle effect will act to offset the driving force available due to the density difference between the liquid in the recycle conduit and the material in the remainder of the reactor as described above and will reduce the amount of the recycle obtainable with a given sized disengaging area. On the other hand, a recycle conduit which is unduly large may reduce the effective reactor volume available for the hydrogenation reaction to an undesirable extent. While size of the recycle conduit is not critical to the invention, the recycle conduit such as the conduit 18 shown in the drawing generally has a cross sectional area 1/100 to 1/5 that of the cross sectional area of the reaction vessel, preferably 1/50 to 1/10 of the cross sectional area of the reaction vessel.

It should be understood that if desired, such as when catalyst size or operating conditions do not permit recycling at desired rates by reason of density difference as described above, conventional recycle equipment such as internal or external recycle lines and pumps may be used to obtain the desired recycle rates or recycle at desired rates may be effected by suitable backmixing within the reactor with or without the use of a recycle conduit.

Effluent from the reactor 16 may be withdrawn through a conduit 23 and passed through a conventional cooler 26 to a separator 28. Liquid is withdrawn from the separator 28 through a conduit 29 and valve 31 and passed to a reactor 51 for further treatment as described below. Vapors are withdrawn from the separator 28 through a conduit 32 and passed through a cooler 34 to a separator 36. From the separator 36, liquid is withdrawn through a conduit 37 and valve 38 while gases are withdrawn through a conduit 39 and valve 41. These gases, which include ammonia and hydrogen, pass through the conduit 39 and a conduit 42 to a conventional scrubber 43 in which ammonia and any $H_2S$ present are removed. Water may enter the scrubber 43 through a conduit 46 and water containing ammonia and $H_2S$ may be removed through a conduit 48. From the scrubber 43, hydrogen-containing recycle gas may be recycled to the reactor 16 through a conduit 44, compressor 45 and conduit 13. Additional hydrogen, if needed, may be introduced through a conduit 47.

The treatment of the feed oil in the reactor 16 as described above serves to partially hydrogenate and crack the feed and make the same more suitable for treatment in the reactor 51 as described below and also serves to remove nitrogen and sulfur compounds which might otherwise poison the hydrocracking catalyst used in the reactor 51. Due to the treatment in the reactor 16, the liquid fraction withdrawn from the separator 28 for treatment in the reactor 51 is substantially free of nitrogen while the gaseous fraction withdrawn from the separator 28 through the conduit 32 contains substantially all of the nitrogen present in the original feed. This nitrogen, in the form of ammonia, stays in the gaseous phase and is removed from recycle gas in the scrubber 43. While the feed to the reactor 16 frequently contains above about 500 parts per million of nitrogen, the liquid fraction serving as feed for the reactor 51 preferably contains less than about 30 parts per million of nitrogen. The function of the cooler 26 is to cool the effluent from the reactor 16 sufficiently so that the liquid fraction passing through the conduit 29 may serve to control the temperature of the reactor 51 as described below. For this purpose it is normally sufficient for the cooler 26 to cool the effluent passing through the conduit 23 a matter of some 100 to 300° F. Since the cooler 26 is being used for this purpose, it is preferably automatically controlled in response to the temperature of the material in the reactor 51 in order to maintain the reactor 51 at the desired temperature.

The liquid fraction withdrawn from the separator 28 through the conduit 29 as described above is passed into the reactor 51 together with added hydrogen supplied through a conduit 48 and valve 49 from the conduit 13. In the reactor 51 the feed fraction, together with the added hydrogen and recycled material, passes upwardly through suitable distributing means such as a conventional bubble cap plate 55 to a hydrocracking zone 52 through which the material passes as indicated by arrows 52a. The hydrocracking zone 52 contains suitable hydrogenation catalysts having cracking activity and is operated under conditions such as those described below to further hydrogenate and hydrocrack the feed to convert a substantial portion thereof to lower boiling material. In the preferred embodiment of the invention in which at least 90 percent of the feed to the reactor 51 boils between about 350 and about 650° F., the treatment in the hydrocracking zone 52 preferably results in conversion of at least 60 percent of the material boiling above 400° F. to material boiling below 400° F. to produce a product having a ratio of heavy naphtha (boiling between about 185 and about 400° F.) to light naphtha (boiling between about 65 and about 185° F.) of at least about 2 to 1, usually greater than 2 to 1 but less than 5 to 1. The ratio of isobutane to normal butane in the product is generally greater than 1 to 1 while the ratio of isopentane to normal pentane is generally greater than 3 to 1.

A slurry of liquid and catalyst particles is recycled from the upper portion of the hydrogenation zone 52 to the lower portion thereof through a recycle conduit 53 as indicated by an arrow 54. The recycle conduit 53 is preferably operated in a manner similar to the operation of the recycle conduit 18 described above and is provided with an upper portion 57a forming a gas disengaging zone 57 similar to the gas disengaging zone 22 described above in connection with the recycle conduit 18. The reactor 51 is preferably provided with a suitable deflector such as 56 for deflecting recycled material in an upward direction for passage upwardly through the hydrocracking zone 52 along with feed and hydrogen-containing gas.

Effluent from the reactor 51 may be withdrawn through a conduit 58 and passed through a cooler 61 to a separator 62 from which liquid product may be withdrawn through a conduit 64 and valve 65 while gaseous product is withdrawn through the conduit 42 and a valve 63. The liquid product withdrawn through the conduit 64 may conveniently be combined with the product withdrawn through the conduit 37 while the gas withdrawn through the conduit 42, which comprises hydrogen-containing recycle gas, may be recycled as described above. The cooler, 61, like the cooler 34, conveniently cools the effluent from the reactor to approximately atmospheric temperature for convenient separation of liquid product from recycle gas. If desired, the effluent from the reactor 51 might be combined with the vaporous fraction withdrawn from the separator 28 through the conduit 32 for cooling and separating in common equipment.

The operation of the cooler 26 as described above eliminates the need for any cooling apparatus in conjunction with the operation of the reactor 51. By thus cooling the effluent from the reactor 16, it is unnecessary to either cool the feed to the reactor 51 or to provide other cooling means, such as recycle coolers, for use in controlling the temperature of the hydrocracking zone 52. The temperature of the material in the reactor 51, like that of the material in the reactor 16, is controlled within narrow limits by recycling liquid and catalyst slurry as described above to keep the temperature difference within the reactor as small as possible. As with the reactor 16, recycle of material within the reactor 51 at preferred recycle rates makes it possible to maintain the temperature difference within the reaction zone within less than 25° F.

The catalyst used in the reactor 51 may be any suitable hydrogenation catalyst having substantial cracking activity. For example, combinations of metals from groups 6 and 8 of the periodic table in various portions supported on a base having an acid or cracking nature may be used. Silica-alumina in various proportions has been found suitable as a base. Other bases having cracking properties such as natural or artificial clays, fluorided alumina, alumina-zirconia, etc. may, however, be used. Suitable catalysts for use on such bases include for instance, cobalt, iron, molybdenum, nickel, tungsten, rhenium, platinum, palladium, etc., as well as combinations of the same. Such catalyst may be used in the oxide or sulfide forms alone or together with other suitable catalysts. Catalyst of the type mentioned above, like catalyst in the reactor 16, is present in the form of finely divided particles. While catalyst of any suitable particle size may be used, it has been found that catalysts having particle sizes less than about 300 microns, preferably between about 50 and about 100 microns, are especially suitable. Catalyst concentration in the reactor is usually greater than 10 pounds of catalyst per cubic foot of reactor volume, preferably greater than, 20 pounds per cubic foot.

A slurry of liquid and catalyst is recycled through the conduit 53 at suitable rates such as between about 1 and about 60 times the rate at which feed is introduced to the reactor 51 with recycle rates between about 7 and about 20 based on such feed being preferred. Such recycle rates allow temperature difference within the reactor to be maintained less than 25° F. Also, since recycled oil is of relatively higher boiling range, such higher boiling unconverted material is given a relatively longer residence time and a high conversion is accomplished without the necessity for external recycling of product fractions. In the operation of the reactor 51, a favorable vapor-liquid split is obtained between relatively light hydrocracked material which is passed out of the hydrocracking zone in the vapor phase shortly after being produced and relatively heavy, unconverted material which remains in the liquid phase and is recycled. This phase split can be controlled by regulating the rate at which hydrogen is passed through the reaction zone. A high hydrogen rate increases the amount of material swept out of the reaction zone in the vapor phase and allows a smaller amount of higher boiling material to recycle for a longer time and become more completely converted. Also, high hydrogen rates minimize the time in which the already converted light material remains in the reactor and prevent an undesirably high amount of conversion of these lighter fractions to very light materials e.g. in the $C_2$–$C_5$ range. It is thus possible to keep the split between light and heavy material in balance between octane and vapor pressure requirements of product by variations in the amount of hydrogen passed through the reactor. The use of an upflow reaction zone and high liquid recycle as described above allows the use of higher gas rates than would otherwise be possible at equivalent space velocities. While the hydrogen rate may vary widely such as between about 1,000 and about 50,000 standard cubic feet of hydrogen per barrel of feed introduced into the reactor, rates above about 7,000 standard cubic feet per barrel are preferred in order to obtain the desired conversion and product distribution mentioned above.

By maintaining both liquid recycle and hydrogen rate relatively high in an upflow reactor as described above, it is possible to obtain desirable conversion and product distributions of the type described above. For operations of this type, the hydrocracking zone 52 is operated under suitable conditions such as spaced velocities of between about 0.5 and about 2.0 volumes of feed per hour per volume of reactor capacity, more usually between about 1.0 and about 2.0 volumes per hour per volume, temperatures between about 500 and about 850° F., preferably between about 650 and about 750 and at a hydrogen partial pressure between about 500 and about 4,000 p.s.i.g. In the absence of the combination of upflow reaction zone, high hydrogen rates and high recycle rates as described above, the desired conversions would be unobtainable except at extremely low space velocities at which costs would be prohibitve and the desirable product distribution between light and heavy naphtha could not be obtained.

As with the reactor 16, it should be understood that if, due to catalyst size, quantity or other considerations, the desired rate of recycle cannot be obtained through the recycle conduit 53 of the reactor 51 by density difference as described above, suitable conventional means such as internal or external recycle lines and pumps may be used. When a slurry of suspended solids is recycled as described above, the velocity of fluid flowing upwardly through the reaction zone should be sufficient to expand the solids to the point where the solid catalyst particles are carried over into the recycle conduit with a liquid. When suspended catalyst particles are thus recycled with liquid, the particles being recycled tend to increase the average density of material within the recycle conduit to the same extent that the presence of catalyst particles in the reactor increases the average density of material in the reactor. The difference in density between the fluid in the recycle conduit and the fluid in the reactor which is necessary to drive the flow of fluid up through the recycle conduit and up through the reactor is thus not substantilly affected by the presence of catalyst which is recycled.

In obtaining the desired high conversions and product distributions discussed above, the use of reaction zones employing recycle of a slurry of catalyst and liquid as described above plays an important role. While other reaction systems such as those of the ebullient or fixed bed type are well suited for use in certain other types of hydrogenation processes, slurry systems of the type described herein offer several unique advantages not obtained with other types of systems in practicing the processes of the present invention. Fixed bed systems are totally unsuitable for use in practicing the present invention because of poor contact between reactants and catalyst and excessive pressure drop and plugging of the catalyst beds at the high conversions and recycle rates generally required by the present invention. Ebullient beds while somewhat better are still not entirely suitable for this purpose.

Finely divide catalysts of a size below 300 microns show an activity advantage over catalyst of a larger particle size. For instance, operation with a reactor containing 12 pounds per cubic foot of catalyst in the size range of 50–100 microns will yield results equivalent to operation with a reactor containing 20 pounds per cubic foot of catalyst in the form of $\frac{1}{32}$ in. extrudates. There is a further advantage of slurry operation in that catalyst can be easily added to the reactor by pumping, and can be removed by carry over with the product, which allows separation downstream. This eliminates a need for catalyst addition pots.

When operating with slurry, the catalyst is recycled with the liquid. Consequently, there is no effect of recycle ratio on the concentration of slurry that can be maintained in the reactor. Conversely, with the ebullated bed technique the catalyst is expanded by the recycle oil, but not recycled; and the concentration of catalyst that can be maintained in the reactor is decreased with increasing recycle ratio. Furthermore, the presence of catalyst in the recycle line of a slurry reactor allows catalytic reactions to take place in the recycle line, thus allowing more efficient use of total reactor space and further reducing the residence time necessary to obtain desired conversions.

In practicing the present invention relatively higher cracking conversions are obtained by operating at higher temperatures and/or lower space velocities. Hydrogen consumption is, of course, higher, resulting in a greater amount of heat release. Higher recycle ratios are, therefore, required to hold the temperature rise across the reaction zone to any specified level. When ebullated bed operation is used, the higher recycle results in a lower catalyst concentration. But with slurry catalyst the concentration need not be lowered and in fact can be increased for reasons to be discussed. Higher catalyst concentration in turn allows the use of smaller, more economical equipment.

The concentration of slurry that can be maintained in the reactor is dependent in part on the rate at which slurry is added to the reactor. As slurry is added to the reactor the catalyst concentration increases, as does the rate of catalyst carry over with effluent from the reactor. When the carry over equals the input, a steady state concentration is reached and no further increase occurs. Operations requiring higher catalyst consumption can be maintained at a higher concentration when slurry catalyst is used. Operation at higher conversions or with poorer quality feeds require greater catalyst consumption. Higher catalyst concentration can, therefore, be maintained when slurry catalyst is used. If ebullated catalyst is used, there is no corresponding increase in catalyst concentration, as there was never any limitation due to carry over.

Also, the carry over of catalyst from the reactor is dependent on the amount of liquid phase material leaving the reactor. At higher conversion the amount of liquid phase material leaving the reactor is less and catalyst carry over is less. This means that for a given catalyst addition rate a higher catalyst concentration can be maintained. There is no corresponding effect for ebullated bed operation.

Generally, it has been found that as a result of all of the above mentioned effects slurry catalyst is preferred when processing a relatively heavy material to a conversion greater than 70 percent of the material boiling over 650° F., or when processing a relatively light material to a conversion greater than 60 percent of the material boiling above 400° F. Thus use of finely divided catalyst is found to be advantageous in both stages for the operations discussed here and such operation forms a part of this invention.

In the operation of the embodiment of the present invention described above in connection with FIGURE 1, as in other catalytic processes, the catalyst becomes less active after a time and must be replaced. It has been found that this may best be accomplished by utilizing partially spent catalyst from the hydrocracking zone 52 in the hydrogenation zone 17 before removing it from the system. As shown in FIGURE 1, catalyst which is allowed to carry over out of the reactor 52 through conduit 58 may be withdrawn from separator 62 through a conduit 20 and valve 66 and introduced into the reactor 16 through the conduit 11. Catalyst allowed to carry over out of the reactor 16 with effluent through the conduit 23 is separated in the separator 28 and may be withdrawn as a slurry through a conduit 24 and valve 25. Fresh catalyst may be introduced into the reactor 51 such as through a conduit 60 at appropriate rates such as between about 0.02 and about 0.2 lb. of fresh catalyst per barrel of fresh feed to the process.

By introducing fresh catalyst into the reactor 51 and using partially spent catalyst from the reactor 51 in the reactor 16, it is possible to avoid contacting fresh catalyst with the highly deactivating nitrogen compounds present in large quantities in the feed to the reactor 16. Also, only one drawoff point for withdrawing catalyst slurry from the system need be provided. This is advantageous because of the valve design and erosion problems associated with removing concentrated catalyst slurry from a high pressure system. The rate at which catalyst is caused to pass out of the reactor 52 through the conduit 58 is controlled by the rate at which fresh catalyst is introduced into the reactor. Once equilibrium conditions have been established, the rate of addition of catalyst into the reactor 52 will also establish the rate at which catalyst passes from the reactor 52 to the reactor 16 and rate at which catalyst carried over from the reactor 16 accumulates in the separator 28 for withdrawal from the system. While it is contemplated that normal operation of the process and apparatus shown in FIGURE 1 will not involve regeneration of catalyst, it should be understood that suitable means of regenerating catalyst may be used if desired.

FIGURE 2 illustrates another embodiment of the invention in which several pieces of equipment shown separately in FIGURE 1 may be combined into one vessel. The process of the invention may be carried out in the apparatus shown in FIGURE 2 in the same manner in which it is carried out in the apparatus shown in FIGURE 1. Referring to FIGURE 2, feed oil entering through a conduit 111 and valve 112 and hydrogen entering through a conduit 113 and valve 114 are passed into a hydrogenation reactor 116 as through suitable distributing means such as a conventional distributing ring 117. This material, together with recycle material, passes upwardly through suitable distributing means such as a bubble cap plate 118 and through a hydrogenation zone 119 as indicated by arrows 119a. The hydrogenating zone 119 preferably contains catalyst and is maintained under operating conditions such as those described above in connection with the reactor 16 and hydrogenation zone 17 of FIGURE 1. From the upper portion of the hydrogenation zone 119, a slurry of liquid and catalyst particles is recycled through a recycle conduit 121 as indicated by an arrow 122. As shown in FIGURE 2, the recycle conduit 121 is provided with an enlarged upper portion 123a to form a gas disengaging zone 123 at the top of the recycle conduit. Deflecting means such as a deflecting cup 127 are preferably provided for deflecting recycled material into an upward direction for passage through the hydrogenation zone together with fresh feed and hydrogen.

Liquid and vapors leaving the upper portion of the hydrogenation zone 119 pass upwardly through a grid or bubble cap plate 126 into an upper portion of the reactor 116 which contains cooling means such as a cooling coil 124 supplied with coolant through a conduit 128 and in which an upper liquid level 132 is maintained by suitable means such as a liquid level controller 133. Cooled liquid is removed from the reactor 116 through a conduit 129 and valve 131 and the liquid level 132 may be maintained by operation of the valve 131 in response to the liquid level controller 133. Vaporous material is withdrawn from the upper portion of the reactor 116 as through a conduit 134 and valve 136.

It will be seen that the cooling coil 124 of FIGURE 2 may perform the same cooling function as the cooler 26 of FIGURE 1 and that the separating function performed by the separator 28 of FIGURE 1 is performed in the upper portion of the reactor 116 of FIGURE 2. The liquid leaving the reactor 116 through the conduit 129 is, therefore, cooled sufficiently to be passed as temperature controlling feed to the reactor 51 of FIGURE 1 while the vapors withdrawn from the reactor 116 of FIGURE 2 may be passed to the separator 36 of FIGURE 1 through the conduit 32. The flow of coolant in the conduit 128 and cooling coil 124 may, of course, be adjusted in response to the temperature of the reactor 51 of FIGURE 1 to maintain the temperature of such reactor at a desired level.

The following specific example illustrates the practical application of the present invention using a process and apparatus similar to that shown in FIGURE 1. In this example a distillate hydrocarbon feed oil having the properties shown below is introduced through the conduit 11 into the reactor 16 together with 10,000 standard cubic feet of hydrogen per barrel of feed, the hydrogen being obtained in the form of hydrogen containing recycle gas through the conduit 13.

*Feed properties*

| | |
|---|---|
| Gravity, ° API | 20.5 |
| Sulfur, wt. percent | 1.85 |
| Nitrogen, p.p.m. | 900 |
| Boiling range, ° F. | 650–1000 |

The first stage hydrogenation zone 17 is maintained at a hydrogen partial pressure of 1,500 p.s.i.g., a temperature of 800° F. and a space velocity of 0.5 volume of fresh feed per hour per volume of reaction zone volume is employed. Liquid and catalyst is recycled by density difference through the conduit 19 at a rate of 60 gallons per minute per square feet and at a rate equal to 15 times the rate of introduction of feed through the conduit 11. The hydrogenation zone 17 contains nickel-tungsten on silica-alumina catalyst and is in the form of microspheroids of 50–100 micron size. Catalyst concentration is 35 pounds of catalyst per cubic foot of reactor volume. Effluent from the reactor 16 is cooled to a temperature of 510° F. in the cooler 26. Liquid withdrawn from the separator 28 through the conduit 29 as feed to the reactor 51 has the following properties:

| | |
|---|---|
| Gravity, ° API | 39 |
| Sulfur, wt. percent | .02 |
| Nitrogen, p.p.m. | 20 |
| Distillation: | |
|     185–400° F., vol. percent | 3 |
|     400–650° F., vol. percent | 87 |
|     650–975° F., vol. percent | 10 |

The hydrocracking zone 52 of the reactor 51 contains the same concentration of nickel-tungsten hydrocracking catalyst on a silica-alumina base used in reactor 16. Fresh catalyst is introduced through conduit 60 at the rate of 0.05 lb. of catalyst per barrel of fresh feed to the process. Feed introduced through the conduit 29 is passed upwardly through the hydrocracking zone 52 together with 8,000 standard cubic feet of hydrogen per barrel of feed with the hydrogen being obtained in the form of hydrogen-containing recycle gas through the conduit 48. The hydrogen recycle gas utilized in the reactors 51 and 16 contains approximately 75 volume percent hydrogen. The hydrocracking zone 52 is maintained at a hydrogen partial pressure of 1,500 p.s.i.g., a temperature of 720° F. and a liquid space velocity of 1.0 volumes fresh liquid per hour per volume of reaction zone. Liquid is recycled by density difference through the conduit 54 at a rate equal to 15 times the rate of introduction of feed through conduit 29. Effluent from the hydrocracking zone 52 is withdrawn through the conduit 58, cooled in the cooler 61 and allowed to separate into vaporous and liquid fractions in the separator 62.

Liquid product recovered from the separator 62 has the following properties:

| | |
|---|---|
| Gravity, ° API | 49 |
| Distillation: | |
|     C$_4$–185° F., vol. percent | 18 |
|     185–400° F., vol. percent | 62 |
|     400–650° F., vol. percent | 20 |

Properties of 185–400° F. fraction:

| | |
|---|---|
| Gravity, ° API | 52 |
| Octane F–1 (clear) | 70 |
| Octane F–1+3 cc. TEL | 89 |

The gaseous material leaving the separator 62 passes through the conduit 42, joints the vaporous material from the separator 36 as shown in FIGURE 1 and is scrubbed and recycled as described above in connection with FIGURE 1. The liquid product from the separator 62 is withdrawn through the conduit 64 and combined with the liquid product from the separator 36. This combined liquid product from the operation of the process as described above has the following properties:

| | |
|---|---|
| Gravity, ° API | 49.5 |
| Yields (based on feed to reactor 16): | |
|     C$_1$–C$_3$, wt. percent | 2.5 |
|     C$_4$–185° F., vol percent | 23 |
|     185–400° F., vol. percent | 83 |
|     400–650° F., vol. percent | 12 |
|     650–975° F. | |
|     C$_4$–625° F., vol. percent | 118 |

Properties of 185–400° F. fraction:

| | |
|---|---|
| Gravity, ° API | 52 |
| Octane F–1 (clear) | 65 |
| Octane F–1 (3 cc.) | 84 |

While the invention has been described above with respect to a preferred embodiment thereof, it will be understood by those skilled in the art that various changes and modifications may be made without departing from the spirit and scope of the invention and it is intended to cover all such changes and modifications in the appended claims.

We claim:

1. The process for treating hydrocarbon feed oil boiling between about 350° F. and about 1,100° F. at least about 40 volume percent of which boils above about 650° F. and which contains at least about 500 parts per million of nitrogen which comprises:

(a) passing said feed oil at least partially in the liquid state together with added hydrogen upwardly through a first vertical hydrocracking zone containing at least about 20 pounds per cubic foot of reactor volume of finely divided hydrogenation catalyst having a particle size less than about 300 microns, said hydrocracking zone being maintained under suitable hydrocracking conditions including a hydrogen rate above about 7,000 standard cubic feet of hydrogen per barrel of feed, a temperature between about 650 and about 900° F., a hydrogen partial pressure between about 500 and about 4,000 p.s.i.g. and a space velocity between about 0.3 and about 1.5 volumes of fresh feed per hour per volume of hydrocracking zone capacity to thereby produce an effluent the hydrocarbon portion of which contains less than about 30 parts per million of nitrogen, has less than about 10 volume percent boiling above about 650° F., has less than 50 volume percent boiling below 400° F. and has a ratio of heavy naphtha boiling between 185° and 400° F. to light naphtha boiling between 65° and 185° F. of more than 5 to 1;

(b) recycling a slurry of liquid and catalyst particles from the upper portion of said hydrocracking zone to a lower portion thereof at a rate between about 7 and about 20 times the rate of addition of fresh feed to said hydrocracking zone to thereby maintain the temperature difference within said hydrrocracking zone less than about 25° F.;

(c) cooling effluent from said hydrocracking zone by between about 100 and about 300° F. at substantially reaction pressure;

(d) separating thus cooled effluent into a liquid fraction and a gaseous fraction containing ammonia and hydrogen and substantially free of material boiling above 400° F. at substantially reaction pressure;

(e) treating said last mentioned gaseous fraction for removal of ammonia therefrom and recycling at least a portion of thus treated gaseous fraction containing hydrogen to said hydrocracking zone;

(f) passing said liquid fraction together with added hydrogen upwardly through a second vertical hydrocracking zone in the presence of at least about 20 pounds per cubic foot of reactor volume of finely divided hydrogenation catalyst having substantial cracking activity and a particle size less than about 300 microns; recycling a slurry of liquid and catalyst particles from the upper portion of said second hydrocracking zone to the lower portion thereof at a rate between about 7 and about 20 times the rate at which said liquid fraction is introduced to said second hydrocracking zone to thereby maintain the temperature difference within said second hydrocracking zone less than about 25° F.;

(g) maintaining said second hydrocracking zone under suitable hydrogenation conditions including a hydrogen rate of greater than 7,000 standard cubic feet of hydrogen per barrel of said liquid fraction introduced into said second hydrocracking zone, a temperature between about 500 and about 900° F., a hydrogen partial pressure between about 500 and about 4,000 p.s.i.g. and a space velocity between about 0.5 and about 2.0 volumes of said liquid fraction per hour per volume of space in said hydrocracking zone;

(h) maintaining the desired temperature in said second hydrocracking zone by controlling the degree of cooling of said effluent from said first hydrocracking zone, and (i) recovering hydrocracked product from said hydrocracking zone, said product having more than 60 volumes percent boiling below 400° F., a ratio of heavy naphtha boiling between 185° and 400° F. to light naphtha boiling between 65° and 185° F. of at least about 2 to 1, a ratio of isobutane to normal butane of at least about 1 to 1 and a ratio of isopentane to normal pentane of at least about 3 to 1.

2. The process according to claim 1 in which the cooling of effluent called for in step (d) takes place in a cooling zone maintained within the same reactor vessel as the first hydrocracking zone and in which such effluent is thus cooled to a temperature between about 100° F. and about 300° F. lower than the temperature maintained in the first hydrocracking zone.

References Cited by the Examiner
UNITED STATES PATENTS

| | | | |
|---|---|---|---|
| 2,839,450 | 6/58 | Oettinger | 208—454 |
| 2,909,476 | 10/59 | Hemminger | 208—59 |
| 2,962,434 | 11/60 | Polenz | 208—108 |
| 2,987,465 | 6/61 | Johanson | 208—109 |

ALPHONSO D. SULLIVAN, *Primary Examiner.*